(12) United States Patent
Paulus et al.

(10) Patent No.: US 9,966,196 B2
(45) Date of Patent: May 8, 2018

(54) TANTALUM EMBEDDED MICROCHIP

(71) Applicant: AVX Corporation, Fountain Inn, SC (US)

(72) Inventors: Joseph W. Paulus, Portland, ME (US); John R. Sturmer, Wells, ME (US)

(73) Assignee: AVX Corporation, Fountain Inn, SC (US)

( * ) Notice: Subject to any disclaimer, the term of this patent is extended or adjusted under 35 U.S.C. 154(b) by 283 days.

(21) Appl. No.: 14/664,957

(22) Filed: Mar. 23, 2015

(65) Prior Publication Data
US 2016/0284476 A1 Sep. 29, 2016

(51) Int. Cl.
| | |
|---|---|
| H01G 9/00 | (2006.01) |
| H01G 9/02 | (2006.01) |
| H01G 9/04 | (2006.01) |
| H01G 9/145 | (2006.01) |
| H01G 9/042 | (2006.01) |
| H01G 9/045 | (2006.01) |
| H01G 4/228 | (2006.01) |
| H01G 9/10 | (2006.01) |
| H05K 5/03 | (2006.01) |
| H01G 9/012 | (2006.01) |
| H01G 9/15 | (2006.01) |
| H01G 9/07 | (2006.01) |

(52) U.S. Cl.
CPC .......... *H01G 9/012* (2013.01); *H01G 9/0032* (2013.01); *H01G 9/07* (2013.01); *H01G 9/15* (2013.01)

(58) Field of Classification Search
CPC ............ H01G 9/012; H01G 9/08; H01G 9/15; H01G 9/052
USPC ................ 361/502, 523, 528, 529, 525, 538
See application file for complete search history.

(56) References Cited

U.S. PATENT DOCUMENTS

| | | |
|---|---|---|
| 3,345,545 A | 10/1967 | Bourgault et al. |
| 4,945,452 A | 7/1990 | Sturmer et al. |
| 5,949,639 A | 9/1999 | Maeda et al. |
| 6,191,936 B1 | 2/2001 | Webber et al. |
| 6,197,252 B1 | 3/2001 | Bishop et al. |
| 6,351,371 B1 * | 2/2002 | Yoshida ............... H01G 9/052 361/508 |
| 6,643,121 B1 | 11/2003 | Huntington |
| 6,673,389 B1 | 1/2004 | Huntington |
| 6,699,767 B1 | 3/2004 | Huntington |
| 6,751,085 B1 | 6/2004 | Huntington |
| 6,813,140 B1 | 11/2004 | Huntington |

(Continued)

*Primary Examiner* — Eric Thomas
*Assistant Examiner* — Arun Ramaswamy
(74) *Attorney, Agent, or Firm* — Dority & Manning, P.A.

(57) ABSTRACT

A solid electrolytic capacitor and method for making the capacitor are provided. The capacitor includes a sintered porous anode body; a sintered anode substrate; a dielectric that overlies at least a portion of the anode body and at least a portion of the anode substrate and that is also formed within at least a portion of the anode body; a solid electrolyte cathode overlying at least a portion of the dielectric that overlies the anode body; an anode termination that is electrically connected to the anode substrate; and a cathode termination that is electrically connected to the solid electrolyte. The anode body is disposed on a planar surface of the anode substrate, and both the anode body and substrate are formed from a powder of a valve metal composition. Further, the anode substrate is hermetic and impermeable to liquids.

26 Claims, 4 Drawing Sheets

(56) References Cited

U.S. PATENT DOCUMENTS

| | | |
|---|---|---|
| 6,849,292 B1 | 2/2005 | Huntington |
| 7,116,548 B2 | 10/2006 | Satterfield, Jr. et al. |
| 7,262,511 B2 | 8/2007 | Osako et al. |
| 7,323,395 B2 | 1/2008 | Huntington |
| 7,515,396 B2 | 4/2009 | Biler |
| 7,687,884 B2 | 3/2010 | Huntington |
| 7,745,281 B2 | 6/2010 | Prymak et al. |
| 8,218,292 B2 | 7/2012 | Rezai-Kalantary |
| 2007/0253147 A1* | 11/2007 | Marek .................. H01G 9/012 361/528 |
| 2008/0030922 A1* | 2/2008 | Hidaka .................. H01G 4/232 361/303 |

* cited by examiner

TANTALUM EMBEDDED MICROCHIP

BACKGROUND OF THE INVENTION

Solid electrolytic capacitors (e.g., tantalum capacitors) have been a major contributor to the miniaturization of electronic circuits and have made possible the application of such circuits in extreme environments. An example of a solid state capacitor and related mass production method for manufacturing surface mountable solid state capacitors is disclosed in U.S. Pat. No. 5,357,399 to Salisbury.

Some solid electrolytic capacitors have an anode lead formed of a substantially planar surface that is bonded to an anode body with a seed/seeding layer. Seed layers, and sometimes the anode bodies as well, have been formed as respective continuous planes of material that are cut in multiple dimensions to provide discrete capacitor elements. For example, U.S. Pat. No. 6,699,767 to Huntington discloses a method for manufacturing multiple solid state capacitors that includes steps for forming such seed and anode components. An entire upper surface of a wafer has sintered thereon a seed layer, for example a dispersion of tantalum powder. A green (i.e. un-sintered) mixture of fine-grained capacitor grade tantalum powder is then pressed onto the upper surface of the substrate to form a green layer. The green layer is sintered to fuse the fine grained powder into an integral porous network. The sintering process also fuses the porous layer to the coarse seeding layer. The substrate assembly is then machined to produce an orthogonal grid of transverse channels and longitudinal channels, which are cut to a depth just beyond the level of the porous tantalum layer so that the cuts impinge on the substrate. The machining process produces an array of orthogonal section bodies, on the substrate, which are ultimately processed to form the anode portions of the capacitors.

In a related variation to the above manufacturing process, a continuous plane of material forming a seed layer is formed over the substrate and sintered. Subsequently, anodes of the same or varying heights are matrix pressed onto the seeded wafer. After pressing, the anodes are sintered. A series of orthogonal cuts must still be performed through the seed layer slightly into the wafer to remove the seed from between respective anode layer bodies and form discrete capacitor elements.

The multiple steps for forming discrete capacitor elements, especially the cutting steps in U.S. Pat. No. 6,669,767 to Huntington to produce the transverse and longitudinal channels, can be a time-consuming and expensive part of the manufacturing process. In addition, generally thicker substrates are required so that the channels can be cut into the substrate beyond the level of the porous tantalum layer thereon, thus limiting potential volumetric efficiency of the capacitor elements. As such, a need currently exists for an improved capacitor element having a decreased height profile and increased volumetric efficiency that can be produced in a simplified, more cost-efficient process.

SUMMARY OF THE INVENTION

In accordance with one exemplary embodiment of the present invention, a solid electrolytic capacitor includes a sintered porous anode body; a sintered anode substrate; a dielectric overlying at least a portion of the sintered porous anode body and at least a portion of the sintered anode substrate, further wherein the dielectric is formed within at least a portion of the sintered porous anode body; a cathode overlying at least a portion of the dielectric that overlies the sintered porous anode body, the cathode including a solid electrolyte; an anode termination that is electrically connected to the sintered anode substrate; and a cathode termination that is electrically connected to the solid electrolyte. The sintered porous anode body and the sintered anode substrate are formed from a powder of a valve metal composition. Further, the sintered porous anode body is disposed on a planar surface of the sintered anode substrate, and the sintered anode substrate is impermeable to liquids.

In accordance with one exemplary embodiment of the present invention, a method of forming a solid electrolytic capacitor includes forming a porous anode body and an anode substrate, wherein the porous anode body and the anode substrate are formed from a powder of a valve metal composition, wherein the porous anode body is disposed on a planar surface of the anode substrate, and further wherein the anode substrate is impermeable to liquids; sintering the porous anode body and the anode substrate; anodically oxidizing at least a portion of the sintered porous anode body and the sintered anode substrate to form a dielectric that overlies at least a portion of the sintered porous anode body and at least a portion of the sintered anode substrate, further wherein the dielectric is formed within at least a portion of the sintered porous anode body; applying a solid electrolyte to at least a portion of the anodically oxidized sintered porous anode body; electrically connecting the sintered anode substrate to an anode termination; and electrically connecting the solid electrolyte to a cathode termination.

Other features and aspects of the present invention are set forth in greater detail below.

BRIEF DESCRIPTION OF THE DRAWINGS

A full and enabling disclosure of the present invention to one skilled in the art, including the best mode thereof, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor and a method for making such a capacitor. The solid electrolytic capacitor includes a sintered porous anode body formed from a powder of a valve metal composition and a sintered anode substrate also formed from a powder of a valve metal composition. The sintered anode substrate is impermeable to liquids and thus facilitates the formation of an effective, hermetic seal between the sintered porous anode body and the sintered anode substrate.

Specifically, the present inventors have found that by sinter bonding a porous anode body to a planar surface of an anode substrate that is hermetic and impermeable to liquids, the cathodic material cannot penetrate into the sintered anode substrate and contacting the anode termination, which could result in a short circuit during use of the resulting capacitor. In addition to being hermetic, the sintered anode substrate also has sufficient surface roughness so that the sintered anode body can be tightly adhered or sealed to the sintered anode substrate without requiring mechanical etching or the application of a seed layer to the substrate, which simplifies the production process and enables the formation of a volumetrically efficient capacitor having a lower height profile or thickness.

Various embodiments of the present invention will now be described in more detail.

I. Anode Component

The anode component, including the porous anode body and the anode substrate, can typically be formed from a powder of a valve metal composition having a specific charge ranging from about 10,000 μF*V/g to about 500,000 μF*V/g, in some embodiments about 15,000 μF*V/g to about 400,000 μF*V/g, in some embodiments from about 20,000 μF*V/g to about 250,000 μF*V/g, in some embodiments from about 25,000 μF*V/g to about 125,000 μF*V/g. As is known in the art, the specific charge may be determined by multiplying capacitance by the anodizing voltage employed, and then dividing this product by the weight of the anodized electrode body.

In one particular embodiment, the porous anode body and the anode substrate of the capacitor of the present invention can be formed from a powder having a specific charge ranging from about 10,000 μF*V/g to about 70,000 μF*V/g, in some embodiments from about 15,000 μF*V/g to about 65,000 μF*V/g, and in some embodiments from about 20,000 μF*V/g to about 60,000 μF*V/g. It is also to be understood that in some embodiments, both the porous anode body and the anode substrate can be formed from a powder having a higher specific charge ranging from about 80,000 μF*V/g to about 500,000 μF*V/g, in some embodiments from about 85,000 μF*V/g to about 400,000 μF*V/g, and in some embodiments from about 90,000 μF*V/g to about 300,000 μF*V/g.

Further, it is to be understood that although the porous anode body and the anode substrate can be formed from the same powder, in one particular embodiment, the porous anode body can be formed from a powder having a higher specific charge than the anode substrate, which can be formed from a powder having a lower specific charge. For instance, the porous anode body can be formed from a powder having a specific charge ranging from about 80,000 μF*V/g to about 500,000 μF*V/g, in some embodiments from about 85,000 μF*V/g to about 400,000 μF*V/g, and in some embodiments from about 90,000 μF*V/g to about 300,000 μF*V/g, while the anode substrate can be formed from a powder having a specific charge ranging from about 10,000 μF*V/g to about 70,000 μF*V/g, in some embodiments from about 15,000 μF*V/g to about 65,000 μF*V/g, and in some embodiments from about 20,000 μF*V/g to about 60,000 μF*V/g.

Meanwhile, in another particular embodiment, the anode substrate can be formed from a powder having a higher specific charge than the porous anode body, which can be formed from a powder having a lower specific charge. For instance, the anode substrate can be formed from a powder having a specific charge ranging from about 80,000 μF*V/g to about 500,000 μF*V/g, in some embodiments from about 85,000 μF*V/g to about 400,000 μF*V/g, and in some embodiments from about 90,000 μF*V/g to about 300,000 μF*V/g, while the porous anode body can be formed from a powder having a specific charge ranging from about 1,000 μF*V/g to about 70,000 μF*V/g, in some embodiments from about 5,000 μF*V/g to about 65,000 μF*V/g, and in some embodiments from about 10,000 μF*V/g to about 60,000 μF*V/g.

Regardless of the specific charge of the power into which it is formed, the valve metal composition contains a valve metal (i.e., a metal that is capable of oxidation) or a valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In one particularly suitable embodiment, the valve metal composition contains tantalum.

To form the anode component (e.g., the anode body and the anode substrate), the powder of the valve metal composition may contain particles any of a variety of shapes, such as nodular, angular, flake, etc., as well as mixtures thereof. Particularly suitable powders are tantalum powders available from Showa (e.g., S506 powder, S708 powder, S15HB powder, etc.), Cabot Corp. (e.g., C255 flake powder, TU4D flake/nodular powder, etc.), and H. C. Starck (e.g., NH175 nodular powder). Although not required, the powder may be agglomerated using any technique known in the art, such as through heat treatment. Prior to forming the powder into the shape of an anode body and the shape of an anode substrate, it may also be optionally mixed with a binder and/or lubricant to ensure that the particles adequately adhere to each other when sintered to form the anode body and the anode substrate. It should be understood, however, that binders and/or lubricants are not necessarily required in the present invention, as the reduced thickness of both the porous anode body and anode substrate of the present invention eliminates the need for a binder or lubricant to ensure adequate adherence of the particles to each other. The resulting powder may then be compacted to form a pellet (e.g., an anode body pellet or an anode substrate pellet) using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

In one particular embodiment, a press mold may be employed that includes a die having two or more portions (e.g., upper and lower portions) configured to form the anode body or the anode substrate. During use, the portions of the die may be placed adjacent to each other so that their walls are substantially aligned to form a die cavity having the desired shape of the anode body or the anode substrate, depending on which component is being formed. After filling the die with powder, the die cavity may then be closed and subjected to compressive forces by a punch. Although two separate press molds can be used, it is also to be understood that the anode body pellet and the anode substrate pellet may be formed in the same mold.

Figure 2:
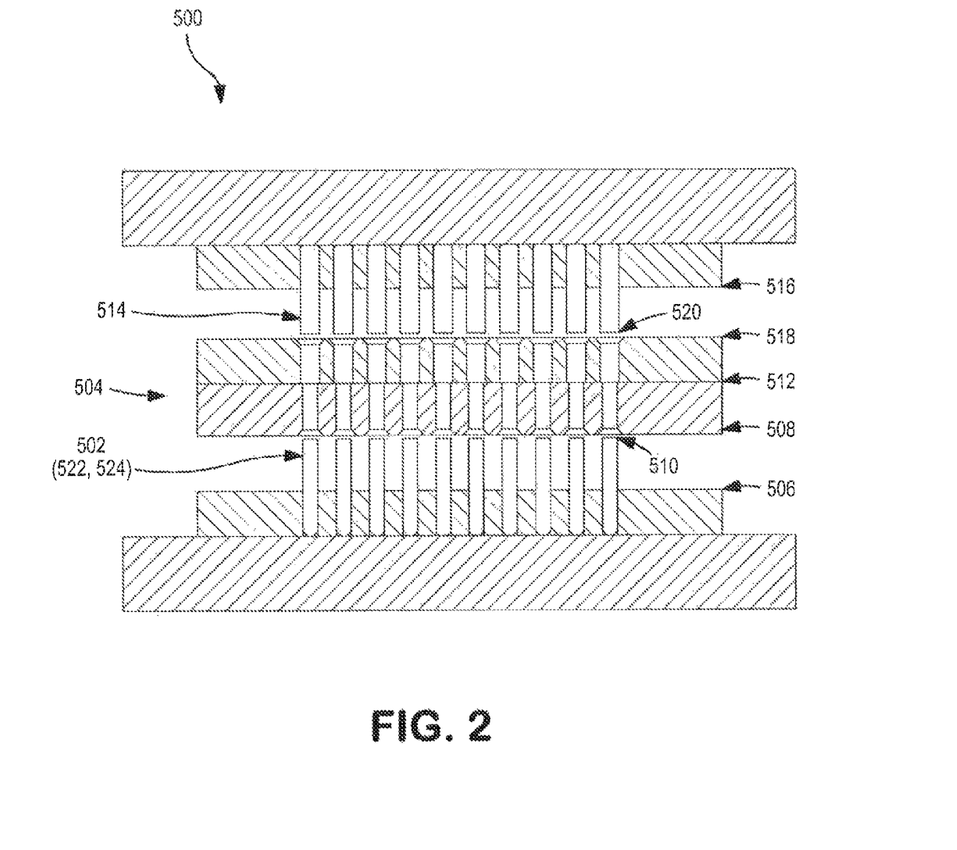
FIG. 2 illustrates one embodiment of a press mold that can be used to form the anode body and anode substrate of the solid electrolytic capacitor of the present invention.

One such embodiment of a die cavity/press mold that can be used for forming the anode body pellets and the anode substrate pellets of the present invention is shown in FIG. 2. To form the anode body and anode substrate using press mold 500, a first punch matrix 502 is inserted into the die 504 until its surface 506 contacts surface 508 (punch surface 510 approximates surface 512). Next, powder that has been pre-weighed is filled into the die cavities for the anode substrate portion of the anode. Then, a second punch matrix 514 is inserted into the die 504 and compressed until its surface 516 contacts surface 518 (punch surface 520 approximates surface 512). The punch length for the second punch matrix 514 is sufficient such that the anode substrate can be compressed to a density falling within the ranges discussed below.

Next, the press mold 500 can be inverted to remove the first punch matrix 502. Then, powder that has been pre-weighted is filled into the die cavities to form the porous anode body portion of the anode. A third punch matrix 522 is then inserted into the die 504 and compressed until its surface 506 contacts surface 508. The punch length for the third punch matrix 522 is sufficient such that the porous anode body can be compressed to a density falling within the ranges discussed below.

Then, first punch matrix 502 and third punch matrix 522 can be removed from the press mold 500, after which the die 504 can be inverted and suspended over a sintering crucible. At this time, a fourth punch matrix 524 can be inserted until its surface 506 contacts surface 508. The length of the punches in the fourth punch matrix 524 are such that its surface 510 protrudes above surface 518 when surface 506 is in contact with surface 508 and the resulting anodes are ejected from the die.

Regardless of the specific press molds from which the pellets are formed, the resulting porous anode body can be pressed to a press density ranging from about 3.5 grams per cubic centimeter to about 10 grams per cubic centimeter, in some embodiments from about 3.75 grams per cubic centimeter to about 9 grams per cubic centimeter, and in some embodiments, from about 4 grams per cubic centimeter to about 8 grams per cubic centimeter, where the press density is determined by dividing the weight of the pressed porous anode body by the volume of the pressed porous anode body. Meanwhile, the resulting anode substrate, which is impermeable to liquids after sintering and has sufficient surface texture to allow for adherence of the porous anode body to a planar surface of the anode substrate, can be pressed to a press density ranging from about 10 grams per cubic centimeter to about 18 grams per cubic centimeter, in some embodiments from about 12 grams per cubic centimeter to about 17.5 grams per cubic centimeter, and in some embodiments, from about 14 grams per cubic centimeter to about 17 grams per cubic centimeter, where the press density is determined by dividing the weight of the pressed anode substrate by the volume of the pressed anode substrate. Further, the ratio of the press density of the anode substrate to the press density of the porous anode body can range from about 1 to about 6, such as from about 1.05 to about 5, such as from about 1.25 to about 4.75, such as from about 1.5 to about 4.5. By pressing the anode substrate to an increased press density as compared to the press density of the porous anode body, such as a density that is near metallic density, the resulting anode substrate is impermeable to liquids, which prevents the application of cathodic material, such as $MnO_2$, on or near the anode termination. Further, the high press density of the anode substrate can facilitate the formation of a hermetic seal between the resulting porous anode body and the anode substrate after sintering. However, it is also to be understood that it is not required that the anode substrate be pressed to a density that is greater than the press density of the porous anode body, such as a density that is near metallic density, in order to render the anode substrate hermetic and impermeable to liquids. For instance, in some embodiments, the anode substrate can be pressed to any density, after which a thin layer or film of a valve metal (e.g., tantalum) can be applied to the exterior surfaces of the anode substrate via physical vapor deposition (PVD), chemical vapor deposition (CVD), or any other suitable method, either before or after sintering, to prevent the penetration of liquids into the anode substrate. Further, if the thin layer or film of the valve metal is applied after sintering, an additional sintering step can occur after application of the thin film or layer.

Figure 1:
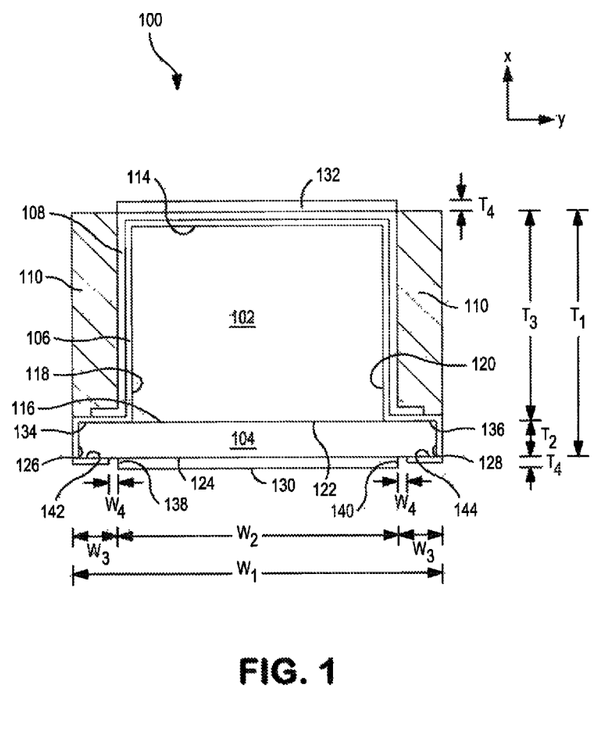
FIG. 1 is cross-sectional view of a solid electrolytic capacitor in accordance with one embodiment of the present invention.

Regardless of the specific method by which the porous anode body and anode substrate are formed, after pressing, any binder/lubricant that was optionally used may be removed by heating the porous anode body and anode substrate under vacuum at a certain temperature (e.g., from about 150° C. to about 500° C.) for several minutes. Alternatively, the binder/lubricant may also be removed by contacting the porous anode body and anode substrate with an aqueous solution, such as described in U.S. Pat. No. 6,197, 252 to Bishop et al., which is incorporated herein in its entirety by reference thereto for all purposes. Thereafter, the porous anode body and the anode substrate can be sintered simultaneously to form a porous anode body adhered or sinter bonded to a planar surface of the anode substrate. Referring to FIG. 1, after sintering, a hermetic or near hermetic seal can be formed between a lower surface 116 of the sintered porous anode body 102 and a planar surface (e.g., an upper surface 122) of the sintered anode substrate 104, which can be due at least in part to the impermeability of the sintered anode substrate 104 to liquids, the increased sintering efficiency of the anode substrate 104 because of its higher press density compared to the porous anode body 102, and the sufficient surface texture present on the anode substrate 104. The porous anode body and anode substrate are typically sintered at a temperature of from about 1200° C. to about 2000° C., in some embodiments from about 1300° C. to about 1900° C., and in some embodiments, from about 1500° C. to about 1800° C., for a time of from about 1 minute to about 100 minutes, and in some embodiments, from about 30 minutes to about 60 minutes. If desired, sintering may occur in an atmosphere that limits the transfer of oxygen atoms to the porous anode body and the anode substrate. For example, sintering may occur in an inert, vacuum, or reducing atmosphere. In one particular embodiment, vacuum sintering may occur at a pressure of from about $1\times10^{-9}$ Torr to about 100 Torr, in some embodiments from about $1\times10^{-8}$ Torr to about 75 Torr, and in some embodiments from about $1\times10^{-7}$ Torr to about 50 Torr. In another embodiment, sintering may occur in a reducing atmosphere of, for instance, hydrogen, where the atmosphere can have a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may be employed in such a reducing atmosphere. After sintering, the porous anode body can be hermetically sealed to a planar surface of the anode substrate due to the sintered anode substrate having a target density that is greater than a target density of the sintered porous anode body. Regardless of the particular target density of the sintered anode substrate and the sintered porous anode body, the ratio of the target density of the sintered anode substrate to the target density of the sintered porous anode body can range from about 1 to about 6, such as from about 1.05 to about 5, such as from about 1.25 to about 4.75, such as from about 1.5 to about 4.5.

As mentioned above, after pressing and prior to adhering the anode body 102 to the anode substrate 104, the anode substrate 104 can be coated with a thin layer of a valve metal (e.g., tantalum) either before sintering or after sintering to render the anode substrate 104 impermeable to liquids and increase its hermiticity. For instance, the upper surface 122, the side surfaces 134 and 136, and the lower surface 124 of the anode substrate 104 can be coated with a thin layer or film of the valve metal used to form the anode body 102 and anode substrate 104 via a thin layer deposition technique such as physical vapor deposition (PVD), chemical vapor deposition (CVD), or any other suitable technique, either before or after sintering the anode substrate 104. Thereafter, if not already sintered, the anode substrate 104 can be sintered and then the porous anode body 102 and the anode substrate 104 can be adhered together. Further, if the thin layer or film of the valve metal is applied after sintering, an additional sintering step can occur after application of the thin film or layer. Application of such a PVD or CVD layer can facilitate the formation of a hermetic seal between the anode body 102 and the upper surface 122 of the anode substrate 104 and can render the anode substrate 104 impermeable to liquids.

As shown in FIG. 1, both the porous anode body 102 and the anode substrate 104 of the anode component of the solid electrolytic capacitor of the present invention are in the shape of a rectangular pellet. In addition to having a rectangular shape, however, the anode body and the anode substrate can have a cylindrical, circular, square, or any other suitable geometric shape. Further, the anode body may also be "fluted" in that it may contain one or more furrows, grooves, depressions, or indentations to increase the surface to volume ratio to minimize ESR and extend the frequency response of the capacitor. Such "fluted" anode bodies are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Regardless of the particular shape of the anode body 102 or the anode substrate 104, the height or thickness of the anode body 102 and the anode substrate 104 can be minimized such that the resulting solid electrolytic capacitor 100 can have a low height profile to facilitate its use, for example, as an embedded passive component or microchip in a printed circuit board. For instance, the overall anode component including the anode body 102 and the anode substrate 104 can have a height or thickness $T_1$ in the x-direction ranging from about 100 micrometers to about 600 micrometers, such as from about 125 micrometers to about 500 micrometers, such as from about 150 micrometers to about 400 micrometers. Meanwhile, the anode substrate 104 can have a thickness $T_2$ in the x-direction ranging from about 10 micrometers to about 100 micrometers, such as from about 20 micrometers to about 80 micrometers, such as from about 25 micrometers to about 75 micrometers. Further, the anode body 102 can have a thickness $T_3$ in the x-direction ranging from about 90 micrometers to about 500 micrometers, such as from about 100 micrometers to about 420 micrometers, such as from about 125 micrometers to about 325 micrometers.

Further, the overall anode component including the anode body 102 and the anode substrate 104 can have a width $W_1$ in the y-direction ranging from about 1 millimeter to about 5 millimeters, such as from about 1.2 millimeters to about 4 millimeters, such as from about 1.4 millimeters to about 3 millimeters. Meanwhile, the anode substrate 104 can have a width $W_2$ in the y-direction ranging from about 0.8 millimeters to about 4.8 millimeters, such as from about 1 millimeter to about 3.8 millimeters, such as from about 1.2 millimeters to about 2.8 millimeters. In addition, the exposed portions 134 and 136 of the upper surface 122 of the anode substrate 104 (i.e., the portions not in contact with the anode body 102) can have a thickness $W_3$ ranging from about 0.05 millimeters to about 1 millimeter, such as from about 0.1 millimeters to about 0.8 millimeters, such as from about 0.2 millimeters to about 0.6 millimeters.

II. Dielectric

Once the anode body is adhered to the anode substrate upon sintering, the resulting anode component may be anodized so that a dielectric is formed over a surface of and/or within the entirety of the anode body and over at least a portion of a surface of the anode substrate, although it is to be understood that because the anode substrate is hermetic and impermeable to liquids, the liquid electrolyte utilized during anodization cannot penetrate the anode substrate so that no internal dielectric is present with respect to the anode substrate. As a result, only a thin layer of dielectric is formed on the exposed surfaces of the anode substrate.

Although not shown in FIG. 1, it is to be understood that after anodization, the dielectric is formed on surfaces within the anode body 102, such as inside its porous structure. Further, a dielectric layer 106 is formed on exterior surfaces of the anode body 102 and the anode substrate 104. For instance, as shown in FIG. 1, the dielectric layer 106 can be formed over an upper surface 114, a first side surface 118, and a second side surface 120 of the anode body 102, as well as over a first side surface 126, a second side surface 128, and portions 134 and 136 of an upper surface 116 of the anode substrate 104 that are free from contact with the anode body 102. In addition, in some embodiments, the dielectric layer 106 can be formed on a first side surface 126 and a second side surface 128 of the anode substrate 104. Further, in some embodiments, portions 142 and 144 of a lower surface 124 of the anode substrate 104 may also be anodized to aid in the electrical isolation of the anode and cathode so that the lower surface 124 includes the dielectric layer 106. However, at least a portion of the lower surface 124 of the anode substrate 104 must be free of the dielectric layer 106 so that electrical contact between the anode substrate 104 and an anode termination 130 can be made. For example, as shown in FIG. 1, after the anode termination 130 is connected to a lower surface 124 of the anode substrate 104, a gap $W_4$ exists between the dielectric layer 106 present on portions 142 and 144 of the lower surface 124 of the anode substrate 104 and opposing ends 138 and 140 of the anode termination 130, where the gap spans a width in the y-direction of at least about 2.5 micrometers such that the lower surface 124 is free of the dielectric layer 106 at the gap $W_4$. It should also be understood that regardless of the exact surfaces on which it is located, the dielectric layer 106 can have a thickness of from about 1 micrometer to about 5 micrometers, such as from about 1 micrometer to about 2 micrometers in some embodiments, where the dielectric layer 106 can provide a coating to physically protect the resulting capacitor.

As stated above, the dielectric is formed by anodization. Anodization is an electrochemical process by which the anode component is oxidized to form a material having a relatively high dielectric constant. For example, the tantalum anode body and the tantalum anode substrate of the present invention may be anodized to tantalum pentoxide ($Ta_2O_5$). Typically, anodization is performed by initially applying an electrolyte to the anode body and anode substrate, such as by dipping the anode body and the anode substrate into the electrolyte. The electrolyte is generally in the form of a liquid, such as a solution (e.g., acid or alkaline), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethyl-caprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive having any suitable range of ionic conductivities. Exemplary electrolytes may include metal salts, alkali salts, alkali salt mixed with a glycol, an acid mixed with an organic solvent, or phosphoric acid mixed with a glycol such as ethylene glycol. To enhance the ionic conductivity of the electrolyte, a compound may be employed that is capable of dissociating in the solvent to form ions. Suitable ionic compounds for this purpose may include, for instance, acids, such as nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, giutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

During anodization, a current is passed through the electrolyte to form the dielectric layer, the anode electrical contact being made to the anode component of the capacitor through the anode substrate. When protic anodization electrolytes are utilized, the rate limiting nature of the anodization process allows for the management of the dielectric thickness through control of the anodization voltage. For example, the anodization power supply may be initially configured galvanostatically until the required voltage is attained, thereafter being switched to a potentiostatic control mode and maintaining the required voltage until the current passing through the electrolyte reaches a fractional value of the initial current achieved in the galvanostatic control mode. Dielectric thickness control can also be achieved through fixed soak times in the potentiostatic control mode. Other known methods may also be employed, such as pulse or step potentiostatic methods. Anodization voltages typically range from about 4 volts to about 250 volts, such as from about 5 volts to about 200 volts, such as from about 9 volts to about 100 volts. During anodization, the electrolyte may be kept at an elevated temperature, such as from about 30° C. to about 200° C., in some embodiments from about 40° C. to about 150° C., such as sin some embodiments from about 50° C. to about 100° C. Anodic oxidation may also be done at ambient temperature or lower. As discussed above, the resulting dielectric layer forms on the surface of the anode body, including those inside the porous anode body structure. The dielectric layer also forms on selected surfaces of the anode substrate, although the hermeticity and impermeability of the anode substrate prevents the dielectric from penetrating inside the anode substrate. The rate of dielectric formation can be governed in part by temperature, with lower temperatures generally resulting in longer formation times.

III. Cathode

Referring again to FIG. 1, after anodization, the anode body 102 including the dielectric layer 106, and optionally portions 134 and 136 of the anode substrate 124 including the dielectric layer 106, may then be subjected to a step for forming a cathode layer 108 that includes a solid electrolyte, such as a manganese dioxide, a conductive polymer, or a combination thereof, etc. Note, however, that any portion of the anode substrate 104 that is free of the dielectric layer 106 must also be free of the cathode layer 108 to maintain electrical isolation between the anode and the cathode components of the capacitor. In other words, the cathode 108 is only present where the dielectric layer 106 is also present, and some surfaces of the anode substrate 104 include the dielectric layer 106 but are free of the cathode layer 108. For instance, in FIG. 1, the lower surface 124 and side surfaces 126 and 128 are free of the solid electrolyte 108, and only part of the portions 134 and 136 of the upper surface 122 of the anode substrate 104 include the cathode layer 108. Preventing deposition of the cathode layer 108 on certain surfaces as discussed above may be accomplished through physical masking during deposition of the cathode layer or via post-deposition material removal.

If the solid electrolyte includes manganese dioxide, the manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, or in conjunction with the formation of a manganese dioxide solid electrolyte, a conductive polymer coating may be employed that contains one or more polyheterocycles (e.g., polypyrroles; polythiophenes, poly (3,4-ethylenedioxythiophene) (PEDT); polyanilines); poly-acetylenes; poly-p-phenylenes; polyphenolates; and derivatives thereof. Moreover, if desired, the conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode body. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy-thiophene) may initially be mixed with a polymerization catalyst to form a solution. For example, one suitable polymerization catalyst is CLEVIOS C, which is iron III toluene-sulfonate and sold by H.C. Starck. CLEVIOS C is a commercially available catalyst for CLEVIOS M, which is 3,4-ethylene dioxythiophene, a PEDT monomer also sold by H.C. Starck. Once a catalyst dispersion is formed, the anode body may then be dipped into the dispersion so that the polymer forms on the surface of the anode body. Alternatively, the catalyst and monomer(s) may also be applied separately to the anode body. In one embodiment, for example, the catalyst may be dissolved in a solvent (e.g., butanol) and then applied to the anode body as a dipping solution. The anode body may then be dried to remove the solvent therefrom. Thereafter, the anode body may be dipped into a solution containing the appropriate monomer. Once the monomer contacts the surface of the anode body containing the catalyst, it chemically polymerizes thereon. Techniques, such as described above, may be described in more detail in U.S. Publication No. 2008/0232037 to Biler.

During or after the application of the solid electrolyte cathode layer, the solid electrolyte may be electrolytically healed. Healing may occur after each application of a solid electrolyte layer or may occur after the application of the entire coating. In some embodiments, the solid electrolyte may be healed by dipping the anode body into an electrolyte solution, such as a solution of acetic acid, and thereafter applying a constant voltage to the solution until the current is reduced to a preselected level or a predetermined soak time has elapsed. If desired, such healing may be accomplished in multiple steps. After application of some or all of the layers described above, anode component containing the dielectric layer and cathode may then be washed if desired to remove various byproducts, excess catalysts, and so forth. Further, in some instances, drying may be utilized after some or all of the dipping operations described above. For example, drying may be desired after applying the catalyst and/or after washing the component in order to open the pores of the anode body so that it can receive a liquid during subsequent dipping steps.

IV. Terminations

Referring to FIG. 1, the solid electrolytic capacitor of the present invention may also contain an anode termination 130 to which the anode substrate 104 of the capacitor element is electrically connected and a cathode termination 132 to which the cathode 108 of the capacitor element is electrically connected. As shown, the anode termination 130 and the cathode termination 132 are planar and are directly connected to the anode substrate 104 and the cathode 108, wherein the planar configuration and the direct electric connection both improve the volumetric efficiency of the resulting capacitor. Further, the direct connection between the anode substrate 104 and the anode termination 130 eliminates the need for an anode lead wire. Moreover, the thickness $T_4$ in the x-direction of the anode termination and cathode termination can be controlled to minimize the height profile or thickness of the capacitor to improve the volumetric efficiency of the resulting capacitor. For instance, the thickness of the terminations may range from about 10 nanometers to about 250 nanometers, such as from about 25 nanometers to about 200 nanometers, such as from about 50 nanometers to about 100 nanometers.

Any conductive material may be employed to form the terminations, such as a conductive metal (e.g., gold, copper, nickel, silver, nickel, zinc, tin, palladium, lead, copper, aluminum, molybdenum, titanium, iron, zirconium, magnesium, tungsten and alloys thereof). In one particular embodiment, however, the conductive metal can be a metal that is resistant to oxidation, such as gold, palladium, or platinum. In an additional embodiment, the conductive material from which the anode termination and the cathode termination are formed can be applied via a thin layer deposition technique such as physical vapor deposition (PVD), chemical vapor deposition (CVD), or any other suitable technique. PVD and CVD can facilitate the deposition of a thin metal layer having a nanometer scale onto the anode substrate and cathode, which can further limit the height profile or thickness and enhance the volumetric efficiency of the solid electrolytic capacitor of the present invention. It is also to be understood that when formed from a oxidation resistant metal, the thin metal layer can be applied so that it is in direct contact with the solid electrolyte, without the need for the application of a carbon layer or any other barrier layer between the solid electrolyte and the cathode termination as are typically applied to prevent oxidation, where the elimination of such layers further reduces the thickness or height profile and enhances the volumetric efficiency of the resulting solid electrolytic capacitor.

In still another embodiment, the terminations can be in the form of a metal plate or layer that can be connected to the anode substrate and cathode using any technique known in the art, such as adhesive bonding and the like. In one embodiment, for example, a conductive adhesive may initially be applied to a surface of the anode and/or cathode terminations. The conductive adhesive may include, for instance, conductive metal particles contained with a resin composition. The metal particles may be gold, silver, copper, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No 2006/0038304 to Osako, et al., which is incorporated herein in its entirety by reference thereto for all purposes.

In yet another embodiment, the terminations can include a PVD or CVD oxygen barrier layer as described above, on which a separate metal layer or plate is disposed. For instance, the oxygen barrier layer can be gold, and the separate metal layer can be silver, titanium, etc.

V. Additional Optional Components

Further, although not required, particularly if an oxidation resistant metal is utilized for the anode termination 130 and cathode termination 132, the solid electrolyte may optionally be applied with a carbon layer (e.g., graphite), a silver layer, or a combination thereof. The silver coating may, for instance, act as a solderable conductor, contact layer, and/or charge collector for the capacitor, while the carbon coating may limit contact of the silver coating with the solid electrolyte with the optional silver coating and/or terminations, which can reduce the risk of oxidation of the silver coating by the solid electrolyte (e.g., manganese dioxide). Such coatings may cover some or all of the solid electrolyte.

In addition, although not required, the solid electrolytic capacitor of the present invention can also include an insulating resin 110 that can be applied around the porous anode body 102 at its side surfaces 118 and 120 and its front and rear surfaces (not shown), where the insulating resin 110 does not extend beyond the exposed portions 134 and 136 of the anode substrate 104 in the y-direction, as shown in FIG. 1. Meanwhile, no resin is disposed above the upper surface 114 of the anode body 102 or beneath the lower surface 124 of the anode substrate 104 in the x-direction. The resin composition may include a thermoset resin such as an epoxy resin. However, it is also to be understood that the solid electrolytic capacitor can be, for instance, embedded into a printed circuit board without having an insulating resin disposed around the porous anode body 102. Instead, the insulating resin can be added to fill in the space between the circuit board and embedded capacitor after the embedded capacitor is properly positioned, or the printed circuit board can into which the capacitor is embedded can include an insulating resin having a recess into which the capacitor can be inserted. In any event, the particular design of the anode body 102 and anode substrate 104 limits the amount of insulating resin 110 that may be utilized, which further enhances the volumetric efficiency of the capacitor.

VI. Applications

In one embodiment of the present invention, the solid electrolytic capacitor of FIG. 1 can be used as an embedded component of a thin electronic part such as a printed circuit board. In another embodiment, the capacitor can have a capacitance rating of about 10 microfarads at a voltage rating of about 10 volts. Due to its small footprint, such a capacitor can be used, for example, in implantable medical devices. The capacitor can have similar dimensions as the silicon-based integrated passives that are known by one of skill in the art and that can be embedded into- a printed circuit board structure. As such, the solid electrolytic capacitor can have a thickness in the x-direction of from about 100 micrometers to about 600 micrometers, such as from about 125 micrometers to about 500 micrometers, such as from about 150 micrometers to about 400 micrometers.

Figure 3:
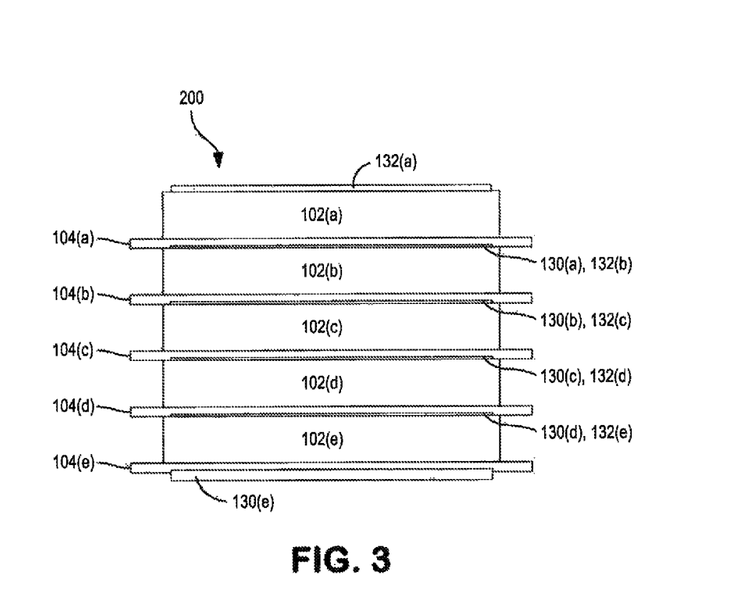
FIG. 3 is a cross-sectional view of a module including multiple capacitors of the present invention arranged in series.
Figure 4:
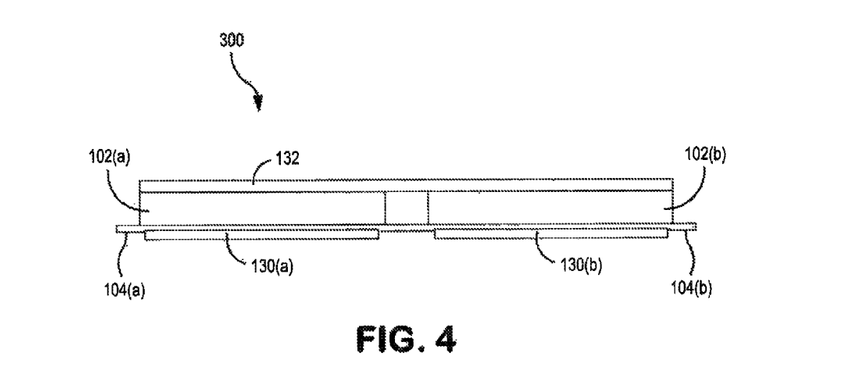
FIG. 4 is a cross-sectional view of a module including multiple capacitors of the present invention arranged in parallel.
Figure 5:
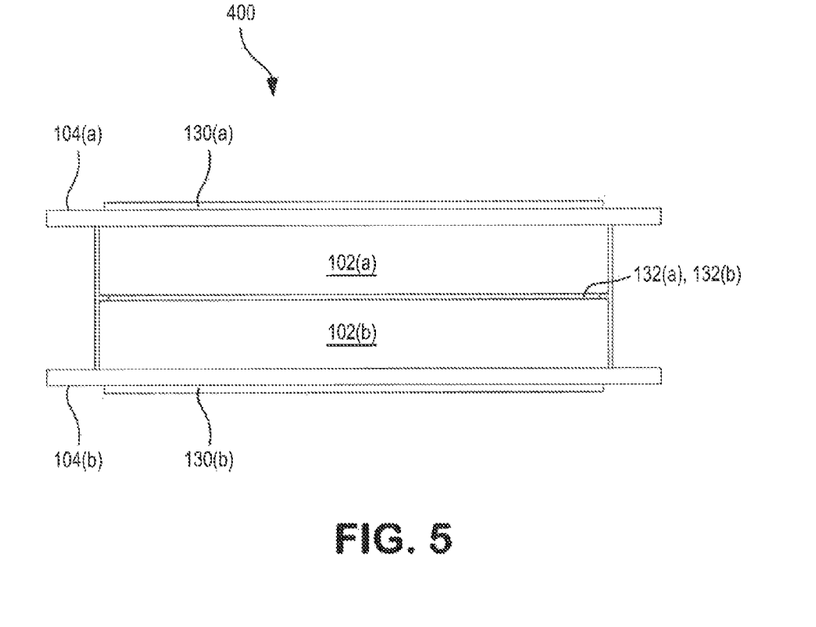
FIG. 5 is a cross-sectional view of a module including multiple capacitors of the present invention arranged in a non-polar configuration.

Referring now to FIGS. 3-5, several modules in which a plurality of the solid electrolytic capacitor of FIG. 1 can be incorporated are illustrated. Such modules can be encapsulated or left unencapsulated for embedding purposes. The modules can include two or more solid electrolytic capacitors of FIG. 1 that can have the same or different capacitance and voltage ratings. Such modules can achieve increases in voltage rating or capacitance, reduction in equivalent series resistance (ESR), allow for non-polarity, or a combination thereof. Depending on the particular arrangement of the module, voltage ratings well beyond 100 volts can be achieved.

In particular, FIG. 3 shows a module 200 that includes five anode bodies 102(*a*)-(*e*), five anode substrates 104(*a*)-(*e*), five anode terminations 130(*a*)-(*e*), and five cathode terminations 132(*a*)-(*e*) arranged in series. When based on a 10 microfarad, 10 volt capacitor, the module 200 can have a capacitance of 10 microfarads and voltage rating of 50 volts.

Further, FIG. 4 shows a module 300 that includes two anode bodies 102(*a*) and 102(*b*) and two anode substrates 104(*a*) and 104(*b*) arranged in parallel. The module also includes anode terminations 130(*a*) and 130(*b*) and a cathode termination 132. When based on a 10 microfarad, 10 volt capacitor, the module 300 can have a capacitance of 20 microfarads and voltage rating of 10 volts. Although not shown, instead of two capacitors, four capacitors can be arranged in parallel in a two capacitor by two capacitor block to achieve a module having a capacitance of 40 microfarads and a voltage rating of 10 volts.

Meanwhile, FIG. 5 shows a module 400 having a non-polar configuration where two anode bodies 102(*a*) and 102(*b*) and two anode substrates 104(*a*) and 104(*b*) are arranged such that the anode the cathode terminations 132(*a*) and 132(*b*) are in contact as shown. When based on a 10 microfarad, 10 volt capacitor, the module 400 can have a capacitance of 5 microfarads and voltage rating of 10 volts.

The capacitors and modules formed in accordance with the present invention can achieve an advantageously increased capacitance and advantageously reduced Equivalent Series Resistance (ESR), while maintaining comparable levels of leakage current and dissipation factor.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor, comprising:
a sintered porous anode body;
a sintered anode substrate, wherein the sintered porous anode body is disposed on a planar surface of the sintered anode substrate, wherein the sintered porous anode body and the sintered anode substrate are formed from a powder of a valve metal composition, and further wherein the sintered anode substrate is impermeable to liquids;
a dielectric overlying at least a portion of the sintered porous anode body and at least a portion of the sintered anode substrate, further wherein the dielectric is formed within at least a portion of the sintered porous anode body;
a cathode overlying at least a portion of the dielectric that overlies the sintered porous anode body, the cathode including a solid electrolyte;
an anode termination that is electrically connected to the sintered anode substrate, wherein the anode termination is connected to a portion of a lower surface of the sintered anode substrate, wherein the portion of the lower surface of the sintered anode substrate is free from contact with the dielectric; and
a cathode termination that is electrically connected to the solid electrolyte.

2. The solid electrolytic capacitor of claim 1, wherein the powder of the valve metal composition has a specific charge ranging from about 10,000 µF*V/g to about 500,000 µF*V/g, wherein the powder comprises tantalum, niobium, aluminum, hafnium, titanium, an electrically conductive oxide thereof, or an electrically conductive nitride thereof.

3. The solid electrolytic capacitor of claim 1, wherein the sintered anode substrate has a target density that is greater than a target density of the sintered porous anode body.

4. The solid electrolytic capacitor of claim 3, wherein the ratio of the target density of the sintered anode substrate to the target density of the sintered porous anode body is from about 1.25 to about 5.

5. The solid electrolytic capacitor of claim 1, wherein a film of a valve metal is disposed on an exterior surface of the sintered anode substrate.

6. The solid electrolytic capacitor of claim 1, wherein the sintered anode substrate is hermetic.

7. The solid electrolytic capacitor of claim 1, wherein the sintered anode substrate has a thickness ranging from about 10 micrometers to about 100 micrometers.

8. The solid electrolytic capacitor of claim 1, wherein the solid electrolyte comprises manganese dioxide, a conductive polymer, or a combination thereof.

9. The solid electrolytic capacitor of claim 1, wherein the solid electrolytic capacitor has a thickness of from about 100 micrometers to about 600 micrometers.

10. The solid electrolytic capacitor of claim 1, wherein the anode termination and the cathode termination each have a thickness ranging from about 10 nanometers to about 250 nanometers.

11. The solid electrolytic capacitor of claim 1, wherein the anode termination and the cathode termination each comprise an oxidation resistant metal, wherein the solid electrolytic capacitor is free of a carbon layer between the solid electrolyte and the cathode termination.

12. The solid electrolytic capacitor of claim 11, wherein the oxidation resistant metal is gold.

13. The solid electrolytic capacitor of claim 1, wherein the anode termination is planar and in direct contact with the sintered anode substrate, further wherein the cathode termination is planar and in direct contact with the solid electrolyte.

14. The solid electrolytic capacitor of claim 1, further comprising at least one electrically insulating material, wherein the electrically insulating material surrounds a portion of the sintered porous anode body and is disposed above a portion of the sintered anode substrate free from contact with the sintered porous anode body.

15. The solid electrolytic capacitor of claim 1, wherein the capacitor is free of an anode lead wire.

16. A module comprising a plurality of the solid electrolytic capacitors of claim 1.

17. The module of claim 16, wherein the plurality of solid electrolytic capacitors are arranged in series, in parallel, or in a non-polar configuration.

18. A method for forming a solid electrolytic capacitor, the method comprising:
forming a porous anode body and an anode substrate, wherein the porous anode body and the anode substrate are formed from a powder of a valve metal composition, wherein the porous anode body is disposed on a planar surface of the anode substrate, and further wherein the anode substrate is impermeable to liquids;
sintering the porous anode body and the anode substrate;
anodically oxidizing at least a portion of the sintered porous anode body and the sintered anode substrate to form a dielectric that overlies at least a portion of the sintered porous anode body and at least a portion of the sintered anode substrate, further wherein the dielectric is formed within at least a portion of the sintered porous anode body;
applying a solid electrolyte to at least a portion of the anodically oxidized sintered porous anode body;
electrically connecting the sintered anode substrate to an anode termination, wherein the anode termination is connected to a portion of a lower surface of the sintered anode substrate, wherein the portion of the lower surface of the sintered anode substrate is free from contact with the dielectric; and
electrically connecting the solid electrolyte to a cathode termination.

19. The method of claim 18, wherein the sintered anode substrate has a target density that is greater than a target density of the sintered porous anode body.

20. The method of claim 19, wherein the ratio of the target density of the sintered anode substrate to the target density of the sintered porous anode body is from about 1.05 to about 5.

21. The method of claim 18, wherein a film of a valve metal is disposed on an exterior surface of the sintered anode substrate.

22. The method of claim 18, wherein the sintered anode substrate is hermetic.

23. The method of claim 18, wherein the sintered anode substrate has a thickness ranging from about 10 micrometers to about 100 micrometers and wherein the solid electrolytic capacitor has a thickness of from about 100 micrometers to about 600 micrometers.

24. The method of claim 18, wherein the anode termination is planar and in direct contact with the sintered anode substrate, further wherein the cathode termination is planar and in direct contact with the solid electrolyte.

25. The method of claim 18, wherein the anode termination and the cathode termination are formed from an oxidation resistant metal and are applied via physical vapor deposition or chemical vapor deposition.

26. The method of claim 25, wherein the oxidation resistant metal is gold.

* * * * *